June 29, 1954   G. H. FAGLEY ET AL   2,682,176
RESILIENT POWER TRANSMISSION MECHANISM
Filed April 8, 1953
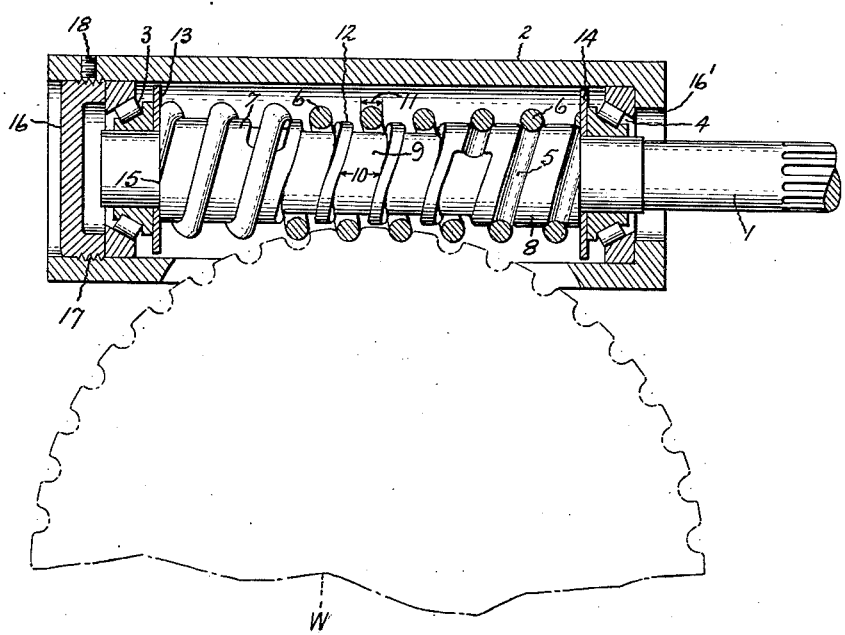
Inventors:
Gilbert H. Fagley,
Wayne E. Birchard,
by: Gilbert P. Tarleton
Their Attorney.

Patented June 29, 1954

2,682,176

UNITED STATES PATENT OFFICE 2,682,176

RESILIENT POWER TRANSMISSION MECHANISM

Gilbert H. Fagley, San Diego, Calif., and Wayne E. Birchard, Pittsfield, Mass., assignors to General Electric Company, a corporation of New York Application April 8, 1953, Serial No. 347,546

8 Claims. (Cl. 74—458)

This invention relates to resilient power-transmission mechanisms and, more particularly, to improvements in worms having resilient driving threads formed by the convolutions of a helical spring surrounding a worm shaft.

In certain applications using worm-type power transmission it is highly desirable to dampen and absorb the normal operating vibrations, thereby increasing the efficiency of the surrounding parts and producing quietness of operation. Heretofore, it has been proposed to obtain such vibration-resistant power transmission by constructing the teeth of the worm of a yieldable or resilient element such as a helical spring wound about the worm shaft. While such constructions have effectively dampened the vibrations, they have been found impractical in applications where the gearing is subjected to sudden or abnormal torques of a high magnitude. Under such extreme torque conditions, the yieldable spring element has become permanently distorted and damaged by the large forces to which it is subjected.

Accordingly, it is an object of our invention to provide a new, improved, and simplified spring-type worm construction.

Another object of our invention is to provide a novel worm construction which resiliently yields in order to dampen vibrations but yet effectively resists damage from the large forces produced during abnormal, high torque conditions.

The objects of our invention may be realized through the provision of a resilient worm construction comprising a worm shaft surrounded by a convoluted helical spring forming a resilient thread thereon, the worm shaft containing projecting portions which are adapted to cooperate with the convolutions of the spring so as to permit the spring to yield in a manner to effectively dampen vibrations but which are adapted to rigidify the spring under abnormal overload conditions so as to prevent damage to the worm construction.

The invention will be better understood by considering the following description taken in connection with the accompanying drawing, and its scope will be pointed out in the appended claims.

In the drawing, the single figure is a view partly in section of a spring-type worm embodying our invention, a cooperating portion of a meshing worm wheel being shown in phantom.

Referring now to the drawing, there is shown a worm shaft 1 rotatably supported in a fixed housing 2 by means of anti-friction bearing assemblies 3 and 4 at opposite end portions of said worm shaft. The worm shaft 1 has a helical groove 5 surrounding said shaft and extending between said bearing assemblies. Into this groove 5 fits a helical spring 6 having substantially the same pitch as that of said groove.

In order to securely anchor the spring 6 in position at its opposite ends, the groove 5 at the end portions 7 and 8 of the shaft is relatively shallow and conforms in contour to the cross-sectional shape of the spring so that said spring fits snugly therein. However, in the central portion 9 of the worm shaft, which is the portion about which the spring 6 is in meshing and driving relationship with the teeth of a worm wheel W, the groove 5 is deeper than at the end portions and has a width 10 considerably greater than the cross-sectional diameter 11 of the spring, thus providing both radial and axial clearance between the spring 6 and the shaft 1 at this central portion 9. These clearances permit the spring to yield in both radial and axial directions, thereby effectively absorbing both the radial and axial vibrations and shocks normally encountered in this type of power transmission.

If the worm should be subjected to abnormal torques of a high magnitude, the spring 6 is permitted to yield axially only until it is forced into mechanical engagement with the rigid helical projection 12 defined by helical groove 5. The outer diameter of this helical projection 12 is substantially greater than the inner diameter of the spring so that the projection fits between the convolutions of the spring. Once this mechanical engagement is established, the spring is rigidified and reinforced and is restrained from further deformation. In this rigid condition, it is readily apparent that the worm and its spring can withstand high forces without damage or undue distortion. As soon as the overload is removed, it is obvious that the resilience of the spring will return the spring to its normally operative position.

An additional feature of our invention, which further contributes to quiet operation and lower manufacturing cost, is the dimensional relationship of the mating thread and teeth. More particularly, the thread formed by the spring 6, when unstressed, i. e., when not in mesh with the worm wheel, should preferably have a linear pitch of a slightly different value from the circular pitch of the teeth on the worm wheel, and the pitch diameters of the mating worm and worm wheel preferably should slightly overlap. With this relationship between the thread and the teeth an intimate engagement between the thread and the teeth is always maintained, the dimensions of the parts can be less accurate, and wear between operative surfaces will automatically be taken up due to the resilience of the thread 6. It is, of course, to be understood that the teeth on the worm wheel W, in a conventional manner, extend across the outer peripheral face of the worm wheel at an angle which permits the teeth and thread 6 to intimately mesh.

In order to effectively resist any tendency of the helical spring 6 to become unscrewed from the shaft 1, we have mounted rigid washers 13, 14 about the shaft at opposite ends of the spring. Washer 13 is firmly clamped in place between an inner race of bearing 3 and a shoulder 15 formed on the worm shaft. Washer 14 is clamped in place in a like manner. The bearing assemblies 3 and 4 are fixed within the housing 2 by a shoulder 16' and the clamping action of a cover 16 having threaded engagement with the housing 2 at 17. A set screw 18 locks the cover 16 against loosening action.

The simplicity of our device is readily apparent when it is considered that the worm may be assembled merely by screwing the helical spring 6 into its operative position about the grooved shaft 1. To maintain this operative relationship, it is only necessary to clamp the bearings 3 and 4 and washers 13 and 14 at opposed ends of the spring by the means 16, 16' shown in the drawing.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What we claim as new and desire to secure by Letters Patent of the United States is:

1. A resilient worm construction comprising a worm shaft containing a helical groove surrounding said shaft and defining a generally helical projection on the surface of said shaft, a spring having convolutions fitting within said groove and having a portion which is adapted to mesh with a worm wheel, said portion fitting within said groove with substantial clearance between the surfaces of said groove and said spring so as to permit said spring to yield so as to dampen vibrations, said helical projection being of a size such as to fit between said convolutions so that said projection is adapted to mechanically engage said convolutions when said worm is abnormally overloaded.

2. A resilient worm construction comprising a worm shaft containing a helical groove surrounding said shaft and extending along its axis and defining a generally helical projection on the surface of said shaft, a spring having convolutions fitting within said groove and having a portion which is adapted to mesh with a worm wheel, said portion fitting within said groove with substantial axial clearance between the surfaces of said groove and said spring so as to permit said spring to yield axially so as to dampen vibrations, said helical projection being of a size such as to fit between said convolutions so that said projection is adapted to mechanically engage said convolutions when said worm is abnormally overloaded.

3. A resilient worm construction comprising a worm shaft containing a helical groove surrounding said shaft and extending along its axis and defining a generally helical projection on the surface of said shaft, a spring having convolutions fitting within said groove and having a portion which is adapted to mesh with a worm wheel, said portion fitting within said groove with substantial radial and axial clearance between the surfaces of said groove and said spring so as to permit said spring to yield both radially and axially so as to effectively dampen vibrations, said helical projection being of a size such as to fit between said convolutions so that said projection is adapted to mechanically engage said convolutions when said worm is abnormally overloaded.

4. A resilient worm construction comprising a worm shaft containing a helical groove surrounding said shaft and defining a generally helical projection on the surface of said shaft, a spring having convolutions fitting within said groove, the convolutions at opposite ends of said spring fitting snugly within said groove so as to anchor said ends to said shaft, generally centrally disposed convolutions being adapted to mesh with a worm wheel, said centrally disposed convolutions fitting within said groove with substantial clearance between the surfaces of said groove and said spring so as to permit said spring to yield so as to dampen vibrations, said helical projection being of a size such as to fit between said convolutions so that said projection is adapted to mechanically engage said convolutions when said worm is abnormally overloaded.

5. A resilient worm construction comprising a worm shaft surrounded by a helical groove defining a generally helical projection on the surface of said shaft, a spring having convolutions fitting within said groove and being prevented from unscrewing by washers fixed to said shaft at opposite ends of said spring, said spring having a portion which is adapted to mesh with a worm wheel, said portion fitting within said groove with substantial clearance between the surfaces of said groove and said spring so as to permit said spring to yield so as to dampen vibrations, said helical projection being of a size such as to fit between said convolutions so that said projection is adapted to mechanically engage said convolutions when said worm is abnormally overloaded.

6. The worm construction of claim 5 being further characterized by said worm shaft having reduced end portions defining shoulders, said shaft being rotatably supported by bearings mounted on said reduced end portions, each of said washers being clamped in place between one of said shoulders and one of said bearings.

7. The worm of claim 1 in combination with a worm wheel having teeth in meshing relationship with the resilient thread of said worm, said worm wheel having a given circular pitch and a given pitch diameter, the resilient thread of said worm, when unstressed, having a linear pitch of a slightly different value from said circular pitch and having a pitch diameter which slightly overlaps the pitch diameter of said worm wheel.

8. The worm of claim 4 in combination with a worm wheel having teeth in meshing relationship with the resilient thread of said worm, said worm wheel having a given circular pitch and a given pitch diameter, the resilient thread of said worm, when unstressed, having a linear pitch of a slightly different value from said circular pitch and having a pitch diameter which slightly overlaps the pitch diameter of said worm wheel.

No references cited.